US008958310B2

(12) United States Patent
Shrirang et al.

(10) Patent No.: US 8,958,310 B2
(45) Date of Patent: Feb. 17, 2015

(54) INVESTIGATING QUALITY OF SERVICE DISRUPTIONS IN MULTICAST FORWARDING TREES

(75) Inventors: Hegde R. Shrirang, Bangalore (IN); Kumar Sanjay, Bangalore (IN); Kumar J. Manoj, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1083 days.

(21) Appl. No.: 12/762,303

(22) Filed: Apr. 17, 2010

(65) Prior Publication Data

US 2011/0255421 A1 Oct. 20, 2011

(30) Foreign Application Priority Data

Jan. 28, 2010 (IN) ............................ 219/CHE/2010

(51) Int. Cl.
*H04L 1/00* (2006.01)
*H04L 12/26* (2006.01)
*H04L 12/28* (2006.01)
*H04L 12/24* (2006.01)

(52) U.S. Cl.
CPC ......... *H04L 43/0894* (2013.01); *H04L 41/0213* (2013.01); *H04L 41/12* (2013.01)
USPC .......................................... 370/244; 370/254

(58) Field of Classification Search
None
See application file for complete search history.

(56) References Cited

U.S. PATENT DOCUMENTS

| | | | | |
|---|---|---|---|---|
| 6,252,848 | B1 * | 6/2001 | Skirmont | 370/229 |
| 2003/0012130 | A1 * | 1/2003 | Novaes et al. | 370/218 |
| 2003/0012132 | A1 * | 1/2003 | Novaes | 370/225 |
| 2003/0236904 | A1 * | 12/2003 | Walpole et al. | 709/231 |
| 2004/0105453 | A1 * | 6/2004 | Shpak et al. | 370/404 |
| 2005/0047342 | A1 * | 3/2005 | Babiarz | 370/232 |
| 2005/0129017 | A1 * | 6/2005 | Guingo et al. | 370/390 |
| 2005/0201278 | A1 * | 9/2005 | Banerjee et al. | 370/229 |
| 2005/0276263 | A1 * | 12/2005 | Suetsugu et al. | 370/389 |
| 2007/0189193 | A1 * | 8/2007 | Previdi et al. | 370/256 |
| 2007/0286093 | A1 * | 12/2007 | Cai et al. | 370/254 |
| 2008/0080501 | A1 * | 4/2008 | Damm | 370/390 |
| 2008/0259784 | A1 * | 10/2008 | Allan et al. | 370/216 |
| 2008/0304485 | A1 * | 12/2008 | Sinha et al. | 370/392 |
| 2009/0138752 | A1 * | 5/2009 | Graham et al. | 714/4 |
| 2009/0190653 | A1 * | 7/2009 | Seo et al. | 375/240.01 |
| 2009/0225759 | A1 * | 9/2009 | Hussain et al. | 370/395.1 |
| 2010/0157788 | A1 * | 6/2010 | Ellis et al. | 370/216 |
| 2010/0182925 | A1 * | 7/2010 | Nagata et al. | 370/252 |
| 2010/0251037 | A1 * | 9/2010 | Cao et al. | 714/57 |
| 2011/0019551 | A1 * | 1/2011 | Adams et al. | 370/235 |
| 2011/0122872 | A1 * | 5/2011 | Balay et al. | 370/390 |
| 2011/0299400 | A1 * | 12/2011 | Cohen et al. | 370/237 |
| 2012/0026876 | A1 * | 2/2012 | Babiarz | 370/232 |
| 2012/0155277 | A1 * | 6/2012 | Jain et al. | 370/241 |

* cited by examiner

*Primary Examiner* — Suk Jin Kang
(74) *Attorney, Agent, or Firm* — Walter W. Karstein

(57) ABSTRACT

Methods, computer-readable storage media and systems may be provided for investigating a Quality of Service ("QoS") disruption among nodes of a computer network that form a multicast forwarding tree. A topology of the multicast forwarding tree may be identified. Performance data may be collected at interfaces between nodes of the multicast forwarding tree. A source of the QoS disruption may be identified by mapping the performance data to the topology.

18 Claims, 3 Drawing Sheets

INVESTIGATING QUALITY OF SERVICE DISRUPTIONS IN MULTICAST FORWARDING TREES

RELATED APPLICATIONS

Benefit is claimed under 35 U.S.C. 119(a)-(d) to Foreign application Serial No. 219/CHE/2010 entitled "INVESTIGATING QUALITY OF SERVICE DISRUPTIONS IN MULTICAST FORWARDING TREES" by Hewlett-Packard Development Company, L. P., filed on Jan. 28, 2010, which is herein incorporated in its entirety by reference for all purposes

BACKGROUND

Multicasting is a bandwidth-conserving technology that reduces network traffic by simultaneously sending data packets to a specific group of receivers. Multicast data packets flow from a source to all receivers in the group over a distribution or forwarding tree. Data packets may be copied when the links to multiple destinations split.

The set of hosts, or nodes, that receive data packets addressed to a particular multicast address may be called a "host group." Membership in a host group may be dynamic. Hosts may join or leave at any time. Accordingly, topology of a multicast forwarding tree may change at any time.

Multicast data packets may be forwarded along a forwarding tree based on their source addresses, for example, by performing a reverse path forwarding ("RPF") check on an incoming data packet. A RPF check may determine whether the incoming data packet arrived on an interface which is an upstream interface towards the source. If the RPF check passes for the incoming multicast data packet, the packet may be forwarded through the node's downstream interfaces that are participating in the multicast group. Otherwise, the packet may be dropped.

With Internet Protocol ("IP") multicast, a source may send data packets to a particular IP multicast address, and all receivers that are interested in receiving this traffic may inform network infrastructure that they have "joined" the host group, which means they will receive traffic directed to the IP multicast address.

IP multicast applications may be based on the user datagram protocol ("UDP"), and may lack a congestion avoidance mechanism. Accordingly, multicast data packets may be dropped more often than packets sent using other protocols, such as transmission control protocol ("TCP"). As a result, applications that utilize IP multicast may suffer degradation in Quality of Service ("QoS").

As multicast data packets are forwarded along a forwarding tree, the path to each receiver may be unique, and so it is possible that only a minority of receivers may experience issues relating to QoS disruptions. Thus, it may be difficult to debug a QoS problem, particularly without being aware of the forwarding tree topology. Moreover, each node in a multicast tree may include one ingress (i.e. incoming) interface and multiple egress (i.e. outgoing) interfaces. Thus, collection of performance data from a potentially large and constantly changing number of interfaces may not be scalable.

DETAILED DESCRIPTION

Methods, computer-readable storage media and systems for investigating QoS disruptions among nodes of a computer network that form a multicast forwarding tree are described herein. A topology of a multicast forwarding tree may be identified. For example, multicast forwarding and routing table information directing a multicast flow may be discovered, and a multicast forwarding tree topology may be computed using the discovered forwarding and routing table information. Performance data may be collected at an ingress interface of each node which is receiving a multicast flow. The collected performance data may be mapped to the identified multicast forwarding tree topology. In this manner, a source of a QoS disruption (e.g., dropped packets, decrease in data flow rate) in a multicast forwarding tree may be identified.

Figure 1:
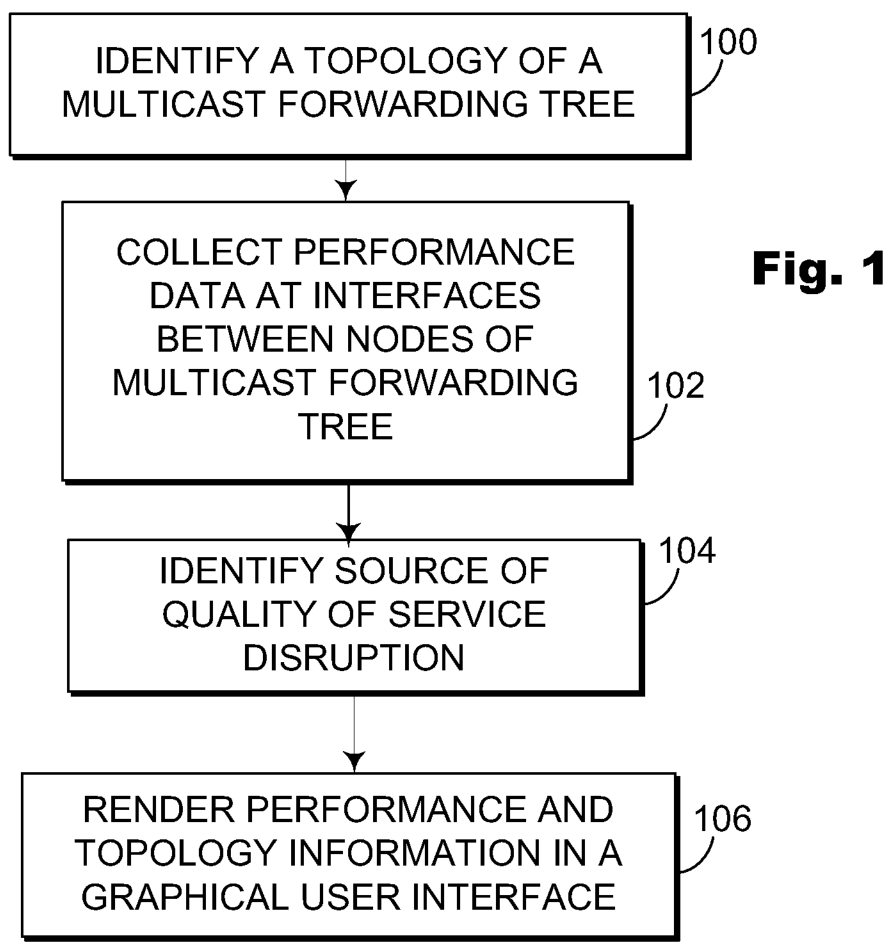
FIG. 1 depicts an example method of investigating QoS disruptions among nodes of a computer network that form a multicast forwarding tree, according to an embodiment of the invention.

Referring to FIG. 1, an exemplary method of investigating a QoS disruption among nodes of a computer network forming a multicast forwarding tree is shown. Although the steps of FIG. 1 are shown in a particular sequence, it should be understood that this sequence may be varied, and some steps may be reordered or even performed simultaneously. The steps of FIG. 1 also may be applied in real time. For example, if a user wishes to investigate QoS of nodes of a multicast forwarding tree, the user may initiate the method of FIG. 1 (e.g., by selecting a URL of a source node), and the steps may be performed on demand.

In step 100, a topology of the multicast forwarding tree may be identified. As indicated by the dashed lines in FIG. 1, step 100 may include sub steps. One such sub step may be discovering multicast forwarding and routing table information directing a multicast flow at step 101. In some embodiments, step 101 may include identifying an ingress (incoming) interface and egress (forwarding) interfaces for the multicast flow on each node receiving that multicast flow. Each egress interface may point to a next hop neighbor node which also may be receiving the multicast flow. This information may be stored in a database for reference.

In step 102, a topology of the multicast forwarding tree may be computed using the multicast forwarding and routing table information discovered in step 101. In some embodiments, this may include identifying a root node and following egress interfaces through the multicast tree to recursively identify neighbor nodes. For example, at each node participating in multicast flow, all egress interfaces may be identified. Then, at each egress interface, a neighbor node at the other end of the interface may be checked. If there is not a valid neighbor node (e.g., the node is down) at the other end of an egress interface, or if the neighbor node at the other end of the egress interface does not pass a RPF check, the method may prune the multicast forwarding tree at that node's egress interface.

If, on the other hand, there is a valid neighbor node at the other end of the egress interface, then the method may proceed to that node and recursively repeat the steps just performed with the parent node. The method may be terminated when it reaches a node with no egress interfaces, or at least with no egress interfaces that lead to a valid neighbor node. Information about each node receiving the multicast flow may be included in a data structure suitable to hold information about a multicast forwarding tree. In some examples, an n-ary tree data structure may be used to hold information about each node, including their ingress and egress interfaces and next hop neighbor.

Referring back to FIG. 1, in step 104, performance data may be collected at interfaces between nodes of a multicast forwarding tree. This may include collecting a packet flow rate at an ingress interface of each node which is receiving this multicast flow as identified in step 100.

In some embodiments, performance data may only be collected at the ingress interface of each node, and may not be collected at each node's egress interfaces. This may reduce the amount of information collected to investigate QoS disruptions in a multicast forwarding tree.

In step 106, the collected performance data may be mapped to the computed topology of the multicast forwarding tree so that a source of QoS disruption may be identified. As noted above in regard to step 104, performance data may only be collected at the ingress interface of each node receiving the multicast flow, and may not be collected at each node's egress interfaces. This is because performance data of an egress interface of a parent node may be inferred from performance data of an ingress interface of a child node. Accordingly, mapping collected performance data to the computed forwarding tree topology may include associating performance data of an ingress interface of each node with a corresponding egress interface of a parent node. For example, in embodiments where data structures such as n-ary trees are used to store information about each node and the multicast forwarding tree as a whole, the information collected at particular a node's ingress interface may be stored at the node's parent, in association with the parent's egress interface.

Figure 2:
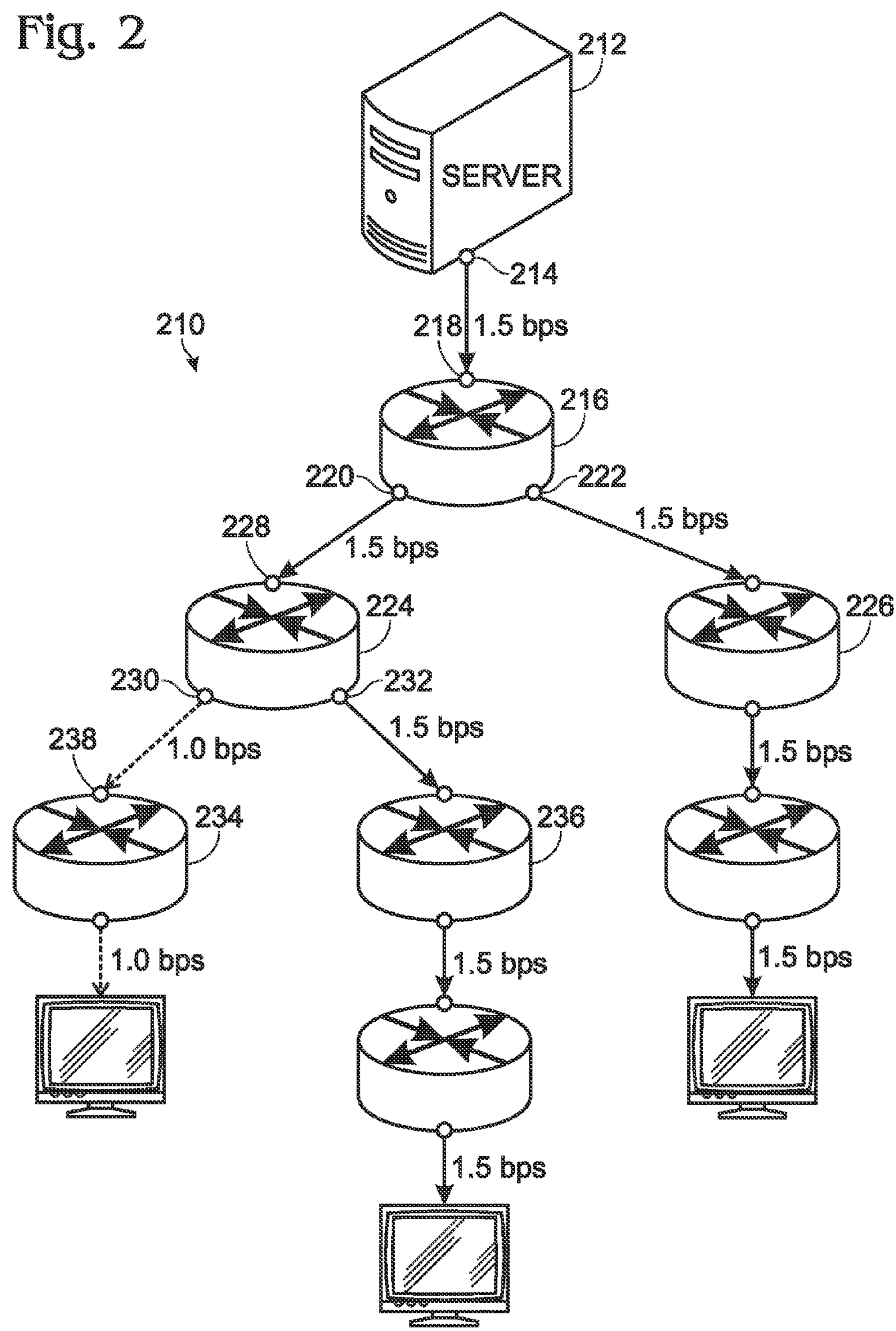
FIG. 2 depicts nodes of an exemplary multicast forwarding tree with a QoS disruption, according to an embodiment of the invention.

Once performance data is mapped to a forwarding tree topology, a source of QoS disruption may be identified in step 108 by identifying a first node that has an egress packet flow rate that is less than an ingress packet flow rate of the first node. An example of this is seen in FIG. 2, which is described in detail below. In some embodiments, a percentage of data packets dropped by the first node may be calculated by dividing the egress packet flow rate of the first node by the ingress packet flow rate of the first node.

In step 110, forwarding tree topology and the mapped performance data may be rendered in a human-readable format, such as in a graphical user interface. FIG. 2 is an example of what may be rendered in a graphical user interface to inform an administrator of sources of QoS disruptions.

In FIG. 2, a plurality of nodes is shown arranged in a multicast forwarding tree 210. A multicast source 212 of multicast forwarding tree 210 may be various types of computer systems. Here, source 212 is a server sending multicast packets to a host group. Data packets that are meant to be sent to all nodes of multicast forwarding tree 210 may be sent initially by source 212.

In this example, identifying a topology, as described above in step 100, may begin with determining that a node 216 has an ingress interface 218 which is directly or indirectly receiving multicast packets from the source 212, which itself acts as root of multicast forwarding tree 210. It may then be determined that multicast packets received by ingress interface 218 are forwarded to two egress interfaces, 220 and 222, which lead to neighbor nodes 224 and 226, respectively. The step of collecting performance data, as described in step 104, above, may be performed at ingress interface 218 of node 216 to determine that the ingress data packet flow rate is 1.5 bps. The flow rate of ingress interface 218 of node 216 also may be associated with multicast packet flow rate at egress interface 214 of source 212.

The method next may proceed to the nodes at the other ends of the egress interfaces 220 and 222; namely, nodes 224 and 226. At node 224, it may be determined that multicast packets are received on ingress interface 228. Multicast packets received on ingress interface 228 of node 224 may be forwarded to two egress interfaces, 230 and 232, which lead to neighbor nodes 234 and 236, respectively. Collecting performance data, as described above in step 104, may be performed at ingress interface 228 of node 224 to determine that the ingress data packet flow rate is 1.5 bps. The flow rate of ingress interface 228 of node 224 also may be associated with egress interface 220 of node 216.

Moving on to node 234, performance data may be collected, as described above in regard to step 104, at ingress interface 238 of node 234 to determine that the ingress data packet flow rate is 1.0 bps. The performance data of ingress interface 238 of node 234 also may be associated with egress interface 230 of node 224. The other nodes shown in FIG. 2, as well as their respective ingress and egress interfaces and performance data, may be discovered in a similar fashion.

Once a multicast forwarding tree topology is identified and performance data is collected at ingress interfaces of nodes participating in multicast forwarding tree, the performance data may be mapped to the topology as described in regard to step 106, so that a source of QoS disruption may be readily ascertained in step 108. In some examples, a QoS disruption may be identified where a node has an egress packet flow rate that is less than an ingress packet flow rate. In FIG. 2, for example, it can be seen that while the data packet flow rate at ingress interface 228 of node 224 is 1.5 bps, the data packet flow rate at egress interface 230 of node 224 is 1.0 bps. This may indicate that packets are being dropped at node 224.

Egress data packet flow rate of a node may be divided by ingress packet flow rate of the same node to determine a percentage of packets that are being dropped by the node. In FIG. 2, for example, the data packet flow rate at egress interface 230 of node 224 (1.0 bps) may be divided by the data packet flow rate at ingress interface 228 of node 224 (1.5 bps) to determine that node 224 is only forwarding 66.66% of packets through egress interface 230. That means node 224 is dropping 33.33% of packets it receives.

As noted above, in some embodiments, the forwarding tree topology and the mapped performance data may be rendered in a human-readable format, such as a graphical user interface. Such an interface may depict nodes of a computer network that form a multicast forwarding tree arranged in a manner similar to that shown in FIG. 2. A node that is identified as a source of QoS disruption may be brought to a user's attention. For example, a node such as node 224 that is identified as a source of QoS disruption may be highlighted or rendered in a different color (e.g., red) than other nodes that are not dropping packets. Additionally or alternatively, a path leading from a node that is identified as a source of QoS disruption may be rendered differently than other paths, such as with dashed lines, as shown in FIG. 2.

Figure 3:
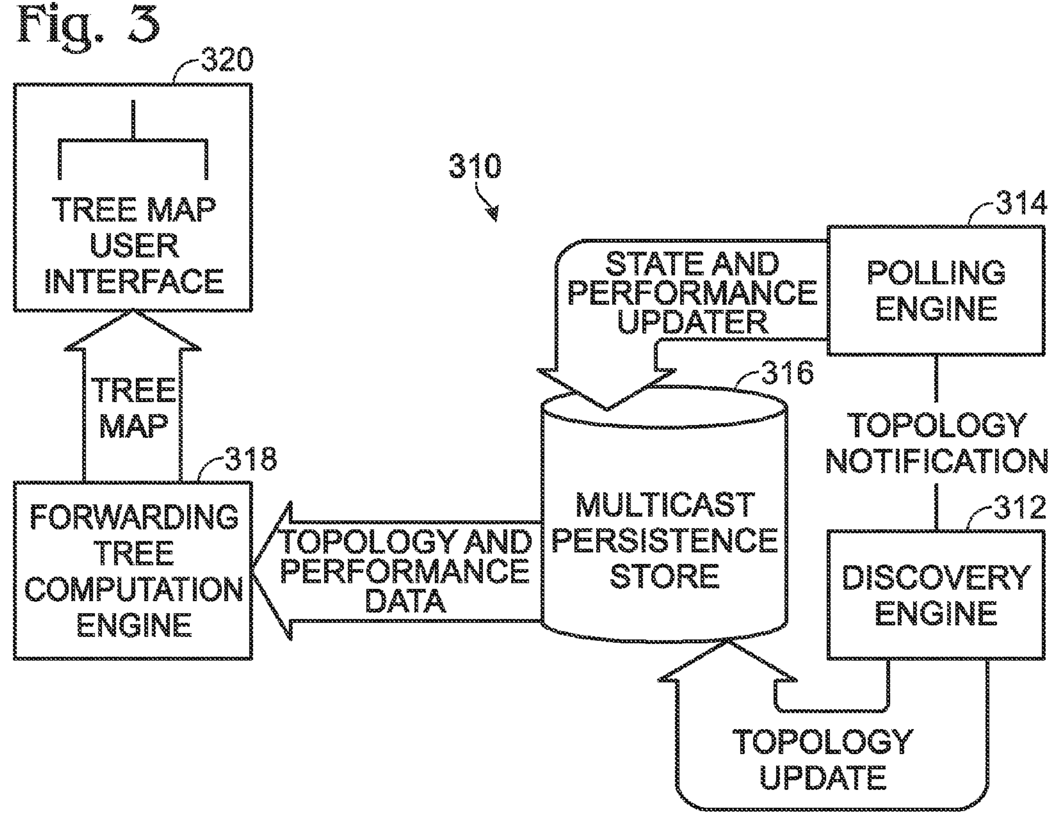
FIG. 3 depicts an exemplary architecture for investigating QoS disruptions in a multicast forwarding tree, according to an embodiment of the invention.

FIG. 3 depicts an example system 310 upon which methods described herein may be implemented. The components depicted in FIG. 3 may be part of computer software executing on a single computer system, or the components may be distributed among separate computer systems that are in communication with one another (e.g., over a computer network).

A discovery component 312 (labeled "Discovery Engine" in FIG. 3) may be provided to discover the multicast forwarding and routing table information directing a multicast flow, as described above in step 101. In some examples, discovery component 312 may obtain this information from the nodes themselves. Discovery component 312 may obtain this information from the nodes using various communication protocols, such as the Simple Network Management Protocol ("SNMP").

A polling component 314, labeled "Polling Engine" in FIG. 3, may be configured to collect performance data on ingress interfaces on the nodes which are forwarding a multicast flow to a next hop as described above in step 104. This may include collecting data packet flow rates at an ingress interface of each node that is identified by discovery component 312. In some embodiments, polling component 314 may receive notification from discovery component 312 that a topology has been identified, so that polling component may collect performance data accordingly.

A multicast persistence store 316 may be provided to receive multicast forwarding and routing table information (labeled "Topology Update" in FIG. 3) from discovery component 312 and performance information (labeled "State and Performance Updater" in FIG. 3) from polling component 314, and to make this information available to other components, such as a forwarding tree computation component 318. Multicast persistence store 316 may be a database or other similar data repository that is connected to other components described herein directly or over a computer network (e.g., a local area network or a wide area network such as the Internet).

One or more of discovery component 312 and polling component 314 may be configured to obtain updated multicast forwarding and routing table information according to one or more schedules, in addition to obtaining this information on demand. For example, discovery component 312 may be configured to identify a new topology for a multicast forwarding and routing table at periodic intervals, and to update information in multicast persistence store 316 with this new information. Likewise, polling component 314 may be configured to collect performance data on ingress interfaces at various intervals or upon the occurrence of various events, and to store the updated information in multicast persistence store 316.

A forwarding tree computation component 318 (labeled "Forwarding Tree Computation Engine" in FIG. 3) may be configured to retrieve the discovered forwarding and routing table directing a multicast flow from persistence store 316 and compute the forwarding tree topology for storage in an n-ary data structure, as described in regard to steps 101 and 102. Forwarding tree computation component 318 also may be configured to obtain performance data from multicast persistence store 316 and map this data to the computed topology.

Forwarding tree computation component 318 may provide the forwarding tree topology data and mapped performance data to a tree map user interface component 320. Tree map user interface component 320 may include a graphical user interface, and may be configured to present the tree to a user in an intuitive and human-readable form, similar to that shown in FIG. 2, for example.

The disclosure set forth above may encompass multiple distinct embodiments with independent utility. The specific embodiments disclosed and illustrated herein are not to be considered in a limiting sense, because numerous variations are possible. The subject matter of this disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether directed to a different embodiment or to the same embodiment, and whether broader, narrower, equal, or different in scope to the original claims, also are regarded as included within the subject matter of the present disclosure.

Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

We claim:

1. A method of investigating a Quality of Service ("QoS") disruption among nodes of a computer network forming a multicast forwarding tree, comprising:
- identifying a topology of the multicast forwarding tree;
- collecting performance data at interfaces of nodes which are part of the multicast forwarding tree;
- mapping the performance data to the topology; and
- identifying a first node of the topology as a source of the QoS disruption where the first node has a determined egress data packet flow rate that is less than a determined ingress data packet flow rate of the first node based upon performance data collected during a multicast flow to determine the ingress and egress data packet flow rates of the first node.

2. The method of claim 1, wherein identifying the topology comprises:
- discovering multicast forwarding and routing information directing a multicast flow; and
- computing the topology of nodes which are receiving the multicast flow using reverse path forwarding.

3. The method of claim 2, comprising collecting performance data at ingress interfaces on nodes which are receiving the multicast flow.

4. The method of claim 3, comprising associating the performance data collected at an ingress interface at each node with an egress interface of a parent node.

5. The method of claim 1, comprising calculating a percentage of data packets dropped by the first node by dividing the egress data packet flow rate of the first node by the ingress data packet flow rate of the first node.

6. The method of claim 1, comprising rendering the forwarding tree topology and the mapped performance data in a human-readable format.

7. A non-transitory computer-readable storage medium having computer-executable instructions to investigate a Quality of Service ("QoS") disruption among nodes of a multicast forwarding tree, the instructions causing a computer to:
- discover multicast forwarding and routing information directing a multicast flow;
- compute a topology of nodes which are receiving the multicast flow;
- collect performance data at interfaces between nodes of the computed topology;
- map the performance data to the topology; and
- identify a first node of the topology as a source of the QoS disruption where the first node has a determined egress data packet flow rate that is less than a determined ingress data packet flow rate of the first node based upon performance data collected during a multicast flow to determine the ingress and egress data packet flow rates of the first node.

8. The non-transitory computer-readable storage medium of claim 7, comprising computer-executable instructions to store the discovered multicast forwarding and route information in an n-ary tree data structure.

9. The non-transitory computer-readable storage medium of claim 7, comprising computer-executable instructions to collect performance data at ingress and egress interfaces on nodes which are receiving the multicast flow.

10. The non-transitory computer-readable storage medium of claim 9, comprising computer-executable instructions to associate the performance data collected at an ingress interface of each node with an egress interface of a parent node.

11. The non-transitory computer-readable storage medium of claim 7, comprising computer-executable instructions to calculate a percentage of data packets dropped by the first node by dividing the egress data packet flow rate of the first node by the ingress data packet flow rate of the first node.

12. The non-transitory computer-readable storage medium of claim 7, wherein to discover multicast forwarding and routing information is performed using a simple network management protocol (SNMP).

13. A system to investigate a Quality of Service ("QoS") disruption among nodes of a multicast forwarding tree, the system comprising:

a discovery component to obtain multicast forwarding and routing information directing a multicast flow;

a polling component to collect performance data at interfaces of nodes which are receiving the multicast flow; and a forwarding tree computation component to compute forwarding tree topology of the nodes which are receiving the multicast flow, map the performance data on the tree topology, and identify a first node of the topology as a source of the QoS disruption where the first node has a determined egress data packet flow rate that is less than a determined ingress data packet flow rate of the first node based upon performance data collected during a multicast flow to determine the ingress and egress data packet flow rates of the first node.

14. The system of claim 13, wherein the polling component collects performance data at ingress and egress interfaces of nodes which are receiving the multicast flow.

15. The system of claim 14, wherein the forwarding tree computation component associates performance data collected at an ingress interface of each node with an egress interface of a parent node.

16. The system of claim 13, wherein the discovery component obtains the multicast forwarding and routing information using a simple network management protocol (SNMP).

17. The system of claim 13, wherein the polling component collects the performance data upon receiving notification from the discovery component.

18. The system of claim 15, wherein the forwarding tree computation component computes forwarding tree topology of the nodes which are receiving the multicast flow using reverse path forwarding.

* * * * *